UNITED STATES PATENT OFFICE.

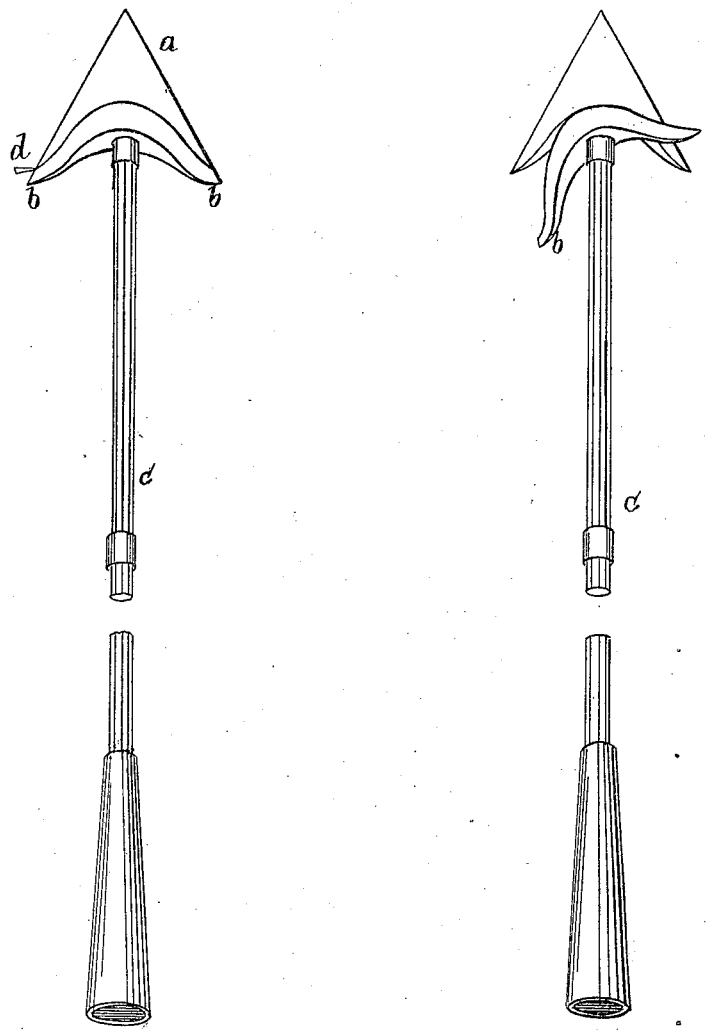

JOHN HOLMES AND ABNER WEST, OF TISBURY, MASSACHUSETTS.

IMPROVEMENT IN HARPOONS.

Specification forming part of Letters Patent No. 4,865, dated November 24, 1846.

*To all whom it may concern:*

Be it known that we, JOHN HOLMES and ABNER WEST, both of Tisbury, in the county of Dukes and Commonwealth of Massachusetts, have jointly invented a new and useful Improvement in the Mode of Constructing Harpoons; and we declare that the following is a full and true and exact description of the same, reference being had to the accompanying drawings.

The nature of the invention or improvement consists in dividing the fluke or barb of the harpoon into two parts or pieces, so that though but one body can enter the whale or other object of attack, yet two parts may hold, the extremity $a$, which acts as a lance, effecting an entrance into the body, and then the other part, $b$, which is movable, turning at the movements of the whale or harpooner, and holding by four points, so that the harpoon will not easily draw or come out.

The movable or turning part of fluke or barb of the harpoon may be kept in its proper position until the blow is struck by a small wedge, $d$, or button or grummet, which will break or be freed by the blow, or by the motions of the whale.

The shank $c$ of the harpoon is made of small wires or rods, in order to give it greater flexibility and diminish the chance of its being broken when bent, hauled upon, or twisted.

What we claim as our joint invention, and desire to secure by Letters Patent, is—

The construction of the fluke or barb of the harpoon in two parts, in such manner that when it is made to enter a whale or other object of attack one part, being movable, may turn, and thereby diminish the chance of its withdrawing, and the making of the handle or shank of several wires or rods instead of one solid piece.

JOHN HOLMES.
ABNER WEST.

Witnesses:
STEPHEN SKIFF,
CHAS. WEST.